United States Patent [19]
Ageev et al.

[11] 3,746,941
[45] July 17, 1973

[54] DEVICE FOR CONTROLLING THE SPEED OF A D. C. MOTOR WITH A NONCONTACT SWITCH

[76] Inventors: Vladimir Egorovich Ageev, ulitsa Berezovaya Roscha, 58, kv. 26; Vera Evgenievna Bukatova, ulitsa Perevertkina, 58, kv. 14; Oleg Alexandrovich Dmitriev, ulitsa Koltsovskaya 112, kv. 15, all of Voronezh, U.S.S.R.

[22] Filed: Oct. 7, 1971

[21] Appl. No.: 187,309

[52] U.S. Cl. ............................................. 318/138
[51] Int. Cl. ............................................. H02k 29/00
[58] Field of Search ........................... 318/138, 254

[56] References Cited
UNITED STATES PATENTS

| | | |
|---|---|---|
| 3,529,220 | 9/1970 | Kobayashi .......................... 318/138 |
| 3,590,353 | 6/1971 | Kobayashi .......................... 318/138 |
| 3,611,081 | 10/1971 | Watson .............................. 318/138 |

Primary Examiner—Bernard A. Gilheany
Assistant Examiner—Thomas Langer
Attorney—Holman & Stern

[57] ABSTRACT

An apparatus for controlling a d.c. motor which has neither a current collector nor brushes, and employs a rotor in the form of a permanent magnet; the d.c. motor has a plurality of phase windings on the stator. A brushless commutator of the motor is connected to the stator windings, as a result of which a field is induced in which field the rotor rotates. The commutator is also connected to a control element which is energized from a rotor-position sensor connected to a secondary power supply source. A semiconductor key controlled by a phase sensitive element is connected between the rotor-position sensor and said secondary power supply source. The phase sensitive element is, in turn, controlled by a variable frequency master oscillator and a feedback element, the feedback element being connected in turn to said control element. The apparatus ensures increased stabilization and effective regulation of speed.

2 Claims, 2 Drawing Figures

DEVICE FOR CONTROLLING THE SPEED OF A D. C. MOTOR WITH A NONCONTACT SWITCH

BACKGROUND OF THE INVENTION

1. Field of the Invention

The invention relates to devices for controlling D.C. motors with noncontact switches.

2. Description of Prior Art

A D.C. motor is advantageous for certain applications since it allows smooth speed regulation by simple means such as controlling the voltage applied to its excitation winding and to the armature winding.

But along with all its recognized advantages, a D.C. motor has a contact type device for current commutation on the collector, which reduces its reliability due to the wear of the collector and brushes, especially in the event of peak or over loads when sparking or even commutator flashover may occur.

To obviate the above drawbacks it has been suggested in prior art that in a D.C. motor a collector with brushes should be replaced with a semiconductor switch operating in conjunction with a rotor position sensor which would control the of the motor commutator.

If the D. C. motor with a semiconductor switch is not required to be able to vary its speed, the switch will be controlled directly by a rotor position sensor.

In case it is required that the motor should rotate at a constant speed irrespective of supply voltage fluctuations, or despite load jumps, as well as in case the motor speed should vary in a preset manner, additional means will have to be resorted to.

Known in the art is a method of stabilizing and controlling the speed of a D.C. motor with a semiconductor switch that involves the use of mechanical means to vary the sensor stator position with respect to the axis of the rotor flux in the motor.

Known also is a method of stabilizing and controlling the speed of such a motor by means of varying the relative position of the axis of the sensor stator flux with respect to the axis of the motor rotor flux, to which end a delay element is included in the control circuit of the rotor position sensor.

There is also a method of stabilizing and regulating the speed of a D.C. motor with a semiconductor switch by additionally controlling the latter with the help of a pulse-width modulator.

The same effect but with increased precision of stabilization can be achieved by means of speeding-up the motor with the use of the sensor with the subsequent substitution of the latter for a stabilized source of variable frequency signals. Although the first method of D.C. motor speed stabilization and control has a certain advantage in comparison with the second method, since it provides a wider range of speed regulation, it has, however, been of limited application due to its relative complexity.

As to the use of a pulse-width modulator in such a system of motor speed control, it should be pointed out that, although it has a high power performance, it does not ensure the required level of speed stabilization accuracy.

On the other hand, if the rotor position sensor in the steady-state mode is substituted for a variable frequency oscillator the system will operate with a sufficiently high stabilization accuracy but the power output of the motor will be reduced.

There is also a device for controlling a D.C. motor with a noncontact switch comprising in combination: a magnetoelectric motor, a master oscillator, a semiconductor switch using power and complementary transistors which commutates the current in the motor phases according to signals from the rotor position sensor that arrive from the secondaries of the sensor, and a high-frequency power supply for the primary of the position sensor.

SUMMARY OF THE INVENTION

The device which is proposed herein for controlling a D.C. motor with a noncontact switch and having a rotor position sensor is more advanced than those referred to above in that it makes it possible to synchronize and control the operation of the motor in a wide range of speed variation by automatically varying the amplitude and the phase of the voltage applied to its winding.

This is achieved with the use of a semiconductor key connected to an output of the rotor position sensor of the motor, the semiconductor key being controlled by a phase-sensitive element one input of which is connected to a master oscillator and the other, to a feedback loop element, while the output circuit of the sensor comprises a control element.

This arrangement has made it possible to improve commercial D.C. motors with semiconductor switches (the M6 — series) at low cost and labor to obtain stabilized and controlled motors of a series operating within a power range from 0.5 W to 20 W with nominal speeds from 1000 r.p.m. to 6000 r.p.m. The result was that any motor of the said series maintained a constant speed irrespective of supply voltage and load fluctuations within ± 50% and ± 45%, respectively. With a constant power supply and a constant load torque on the motor shaft the variation in efficiency of the motor caused by speed variations changed in the aforesaid instances by only 10–12 %.

BRIEF DESCRIPTION OF THE DRAWING

The invention will be better understood from its subsequent detailed description given with reference to the accompanying drawings and exemplary embodiments. However, it is to be understood that the invention is not limited to the described embodiment.

It also should be borne in mind that proposed objectives and advantages of the present invention, in addition to those specified above, will become evident from the following description and consideration of the drawings in which.

DESCRIPTION OF PREFERRED EMBODIMENT

Figure 1:
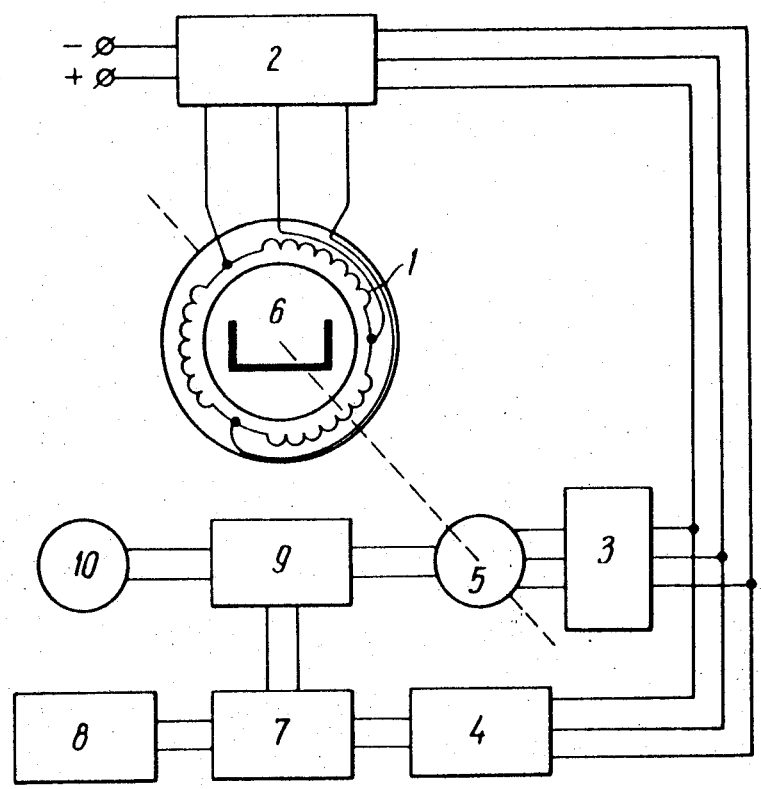
FIG. 1 presents a block-diagram of the device proposed for controlling a D.C. motor with a noncontact switch.

A winding 1 (FIG. 1) of the magnetoelectric motor is connected to the output of a semiconductor switch 2 while the input of the switch is connected to the output of a control element 3. At the same time the output of the control element 3 is connected to a feedback loop element 4. The input of the control element 3 is connected to the output of a rotor position sensor 5 which is rigidly coupled with the rotor 6 of the magnetoelectric motor. The feedback loop element 4 is connected to one of the inputs of a phase-sensitive element 7, the other input of which is connected to a variable frequency master oscillator 8. Connected to the output of the phase-sensitive element 7 is a controlled semiconductor key 9 which is connected, on the one hand, to the rotor position sensor, and on the other, to a power supply 10 of the rotor position sensor. The rotor position sensor is supplied preferably from a semiconductor variable frequency oscillator.

Figure 2:
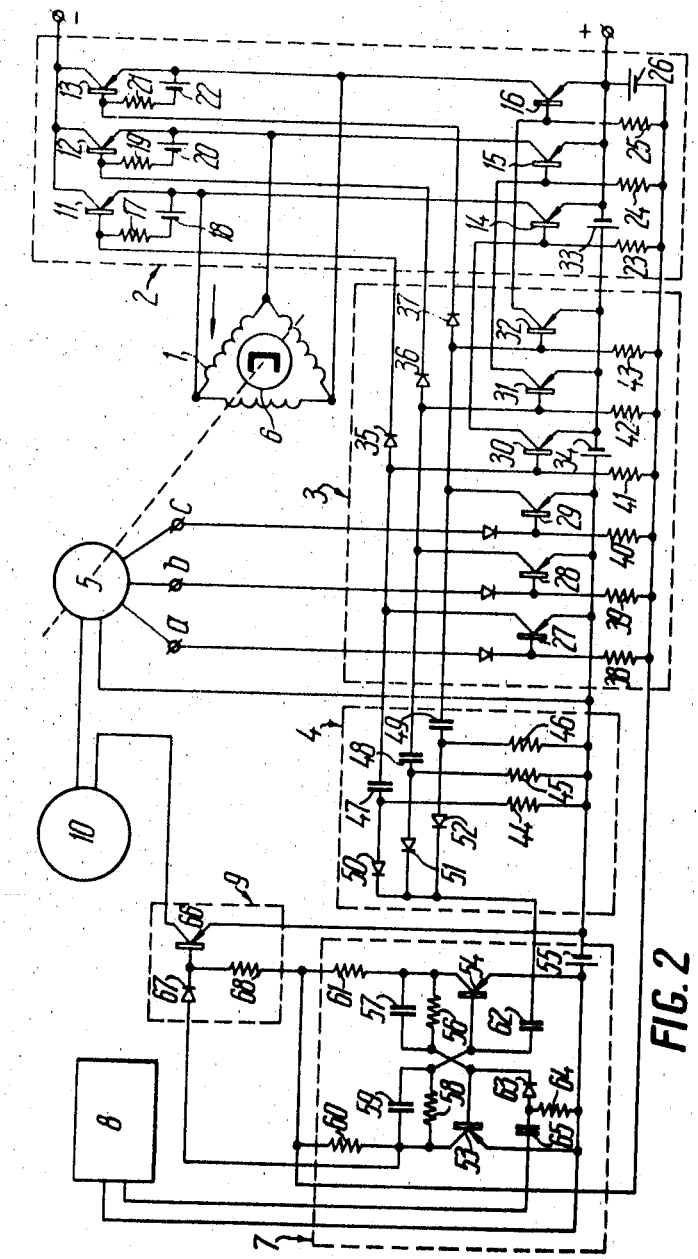
FIG. 2 is a schematic of a preferred version of the D.C. motor control device.

The switch 2 (FIG. 2) is arranged as a three-phase bridge circuit using transistors 11–16 and energized from a D.C. power supply.

The emitters of transistors 11, 12, 13 are connected in series with the collectors of transistors 14, 15, 16; the emitters of the latter are connected to the positive terminal of the D.C. power supply while the collectors of the transistors 11, 12, 13 are connected to the negative terminal of the D.C. power supply. Connected to the junction points of transistor pairs 11–14, 12–15 and 13–16 are output leads of the motor winding 1. A resistor 17 and an auxiliary D.C. power supply 18 are connected in series between the base and the emitter of the transistor 11; between the base and the emitter of the transistor 12 there are a resistor 19 and an auxiliary D.C. power supply 20; between the base and emitter of the transistor 12 there are a resistor 21 and an auxiliary D.C. power supply 22, emitters being connected to the positive terminals of the D.C. power supplies 18, 20 and 22 respectively. Connected to the bases of the transistors 14, 15, 16 are resistors 23, 24, 25 respectively and the negative of an auxiliary D.C. power supply 26, the positive terminal of the power supply 26 being connected to the emitters of the transistors 14–16.

The control element 3 uses six transistors 27–32. The emitters of the transistors 30–32 are coupled with the emitters of the transistors 14–15 through an auxiliary D.C. power supply 33, the positive terminal of which is connected to the emitters of the transistors 30–32. The emitters of the transistors 27–29 are coupled with the emitters of the transistors 30–32 through an auxiliary D.C. power supply 34 the positive terminal of which is connected to the emitters of the transistors 27–29. The collectors of the transistors 30, 31, 32 are connected to the bases of the transistors 14, 15, 16, respectively. The collectors of the transistors 27, 28, 29 are connected to the bases of the transistors 30, 31, 32, respectively, and to the bases of the transistors 11, 12, 13 via diodes 35, 36, 37 respectively the positive electrodes of the diodes 35–37 being connected to the collectors of the transistors 27–29. Connected between the bases of the transistors 27, 28, 29, 30, 31, 32 and the auxiliary D.C. power supply 26 are resistors 38, 39, 40, 41, 42, 43, respectively.

The feedback loop element comprises differentiating networks using resistors 44, 45, 46 and capacitors 47, 48, 49, respectively, connected in parallel via diodes 50, 51, 52, the positive electrodes of the diodes 50, 51, 52 being connected to the resistors 44, 45, 46 and to the capacitors 47, 48, 49 respectively. On the other hand the capacitors 47, 48, 49 are connected to the collectors of the transistors 27, 28, 29 respectively, while the resistors 44–46 are connected to the emitters of the transistors 27–29.

The phase-sensitive element 7 uses two transistors 53 and 54 the emitters of which are connected, via an auxiliary D.C. power supply 55, to the emitters of the transistors 27-29, the positive terminal of the D.C. power supply being connected to the emitters of the transistors 53, 54. The base of the transistors 53 is connected to the collector of the transistor 54 via a resistor 56 and a capacitor 57 which are connected in parallel, while the base of the transistors 54 is connected to the collector of the transistor 53, via resistor 58 and a capacitor 59 which are connected in parallel. Connected between the auxiliary D.C. power supply 26 and the collectors of the transistors 53 and 54 are resistors 60 and 61 respectively. The base of the transistor 54 is connected to the diodes 50–52 via a capacitor 62. Connected to the base of the transistor 53 is the negative electrode of a diode 63. The positive electrode of the diode 63 is connected to a resistor 64 and a capacitor 65. The other lead of the resistor 64 is connected to the emitters of the transistors 53 and 54 while the second lead of the capacitor 65 is connected to one of the terminals of the master oscillator 8. The other terminal of the oscillator is connected to the emitters of the transistors 53 and 54.

The semiconductor key 9 uses a transistor 66 the emitter of which is connected to the emitters of the transistors 27–29 while the collector is connected to the power supply 10 of the position sensor. Connected between the base of the transistor 66 and the collector of the transistor 53 is a diode 67, the anode of which is connected to the collector of the transistor 53. Connected between the base of the transistor 66 and the auxiliary D.C. power supply 26 is a resistor 68.

The second terminal of the power supply 10 of the position sensor is connected to one of the terminals of the rotor position sensor 5, the other terminal of which is connected to the emitters of the transistors 27–29.

The D.C. motor with the semiconductor switch can operate in the starting and in the locking modes.

In the starting mode the motor operates as follows.

As soon as the motor is energized a signal from the master oscillator 8 sets the phase-sensitive element 7 into a state in which the transistor 54 starts conducting and the transistor 53 is cut-off. The result is that the semiconductor key 9 which is cut-off by the positive voltage of the power supply 55, arriving via the transistor 53, starts conducting and the input of the rotor position sensor 5 is energized from the power supply 10.

Up to this moment (while the controlled key is closed) the transistors 27, 28, 29 have been saturated by the voltage from the power supply 26. The transistors 30–32 have been cut-off by the positive voltage of the power supply 34 arriving through the transistors 27–29. Hence, the transistors 11–13 have been cut-off by the positive voltages of the power supplies 33 and 34 arriving through the transistors 27–29 while the transistors 14–16 have been saturated by the voltage of the power supply 26. Therefore, there has been no voltage across the motor winding.

As soon as the semiconductor key 9 is closed the output of the rotor position sensor 5 ($a, b, c$) feeds the input of the control element 3 with positive signals which drive the transistors 27–29 to another stable state such as, for instance, when the transistors 27, 28 are cut-off. The result is that the transistors 11 and 12 become saturated as ensured by the power supplies 18, 20. Simultaneously, the transistors 30, 31 become saturated due to the effect of the power supply 26, while the transistors 14 and 15 are cut-off by the positive voltage fed to them from the power supply 33 via the transistors 30 and 31 respectively. Therefore, the transistors 11, 12, 16 of the switch conduct while the transistors 13-15 are cut-off, due to which a current starts flowing through the winding 1 of the motor from the main D.C. power supply. The current produces an electromagnetic moment which turns the rotor. As soon as the rotor turns through a certain angle followed by a respective turn of the position sensor rotor, the transistors 27-29 will reverse their states, i.e. the transistor 27 will start conducting and the RC-networks (44,47) will produce a differentiating pulse. The phase-sensitive element 7 is switched over to another state and the key 9 becomes open. After that the transistors 11-13 of the switch 2 become cut-off again, which de-energizes the motor winding from the D.C. power supply, and the transistors 14 – 16 become saturated and short circuit the motor winding, which causes the electrodynamic of the rotor of the motor.

This state of the device lasts, however, for a short period of time, since in the starting mode of operation the frequency of the master oscillator is much higher than that of the rotor rotation. Hence, the next pulse of the master oscillator again drives the phase sensitive element 7 to its first state in which the transistor 53 is cut-off and the transistor 66 of the key starts conducting and connects the power supply of the position sensor 10 to the rotor position sensor 5. The result is that the semiconductor switch 2 passes to another state in which the transistors 12, 14, 16 conduct, while the transistors 11, 13, 15 are cut-off.

Hence, there again appears an electromagnetic moment or rotating force which continues turning the rotor. The rotor will be driven until the on-off rate of the supply circuit of the rotor position sensor 5 is equal to the frequency of the master oscillator 8. In this mode of operation (locking) the closing time of the semiconductor key 9 depends upon the phase difference between the rotation rate of the rotor 6 and the frequency of the master oscillator 8, the phase difference being determined by the selection of the master oscillator frequency, the voltage of the power supply and the torque of the load. Owing to his arrangement, the voltage fed to the winding 1 of the magnetoelectric motor via the transistors of the semiconductor switch 2 becomes pulse-width modulated. A reduction of the frequency of the master oscillator 8, for example, will increase the time during which the motor windings are de-energized and, hence, lower the average value of the voltage applied to the motor winding, which, in its turn, will reduce the speed of the rotation of the motor rotor.

What we claim is:

1. A device for controlling a direct current motor having a non-contact commutator and a rotor in the form of a permanent magnet rotating between stator windings which are energized from a direct current source, said device comprising, in combination: a semiconductor commutator having an input and an output, the input being connected to said direct current source and the output to the stator windings of the direct current motor, said windings having winding phases; a rotor-position sensor means rigidly coupled to the rotor shaft of the motor to produce signals in accordance with which said commutator successively connects the phases of the motor windings, said rotor-position sensor receiving power supply from a power supply source connected thereto; a semiconductor key having a control input connected to make and break electrical connection between said rotor-position sensor and the supply source thereof; a phase-sensitive device controlling said semiconductor key and having first and second inputs and an output, said output being connected to the control input of said semiconductor key; a variable frequency master oscillator producing an output signal and connected to said first input of said phase-sensitive device; a feedback means for producing an indicative signal representative of the rotation of the rotor and transmitting said indicative signal to said phase-sensitive device, said feedback means having an input and an output which is connected to the second input of said phase-sensitive device; a control element means responsive to said position sensing means to disconnect the motor winding from the direct current source and to effect electrodynamic braking of the motor at a moment when said semiconductor key opens, the input of the feedback means being connected to said control element.

2. A device for controlling a direct-current motor, as claimed in claim 1, wherein said feedback means comprises R–C circuits.

* * * * *